United States Patent
Fakoorian et al.

(10) Patent No.: US 11,102,765 B2
(45) Date of Patent: Aug. 24, 2021

(54) ENHANCED UPLINK GRANT-FREE/DOWNLINK SEMI-PERSISTENT SCHEDULING FOR ULTRA-RELIABLE LOW LATENCY COMMUNICATIONS

(71) Applicant: QUALCOMM Incorporated, San Diego, CA (US)

(72) Inventors: Seyed Ali Akbar Fakoorian, San Diego, CA (US); Srinivas Yerramalli, San Diego, CA (US); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/282,009

(22) Filed: Feb. 21, 2019

(65) Prior Publication Data

US 2019/0261354 A1  Aug. 22, 2019

Related U.S. Application Data

(60) Provisional application No. 62/634,106, filed on Feb. 22, 2018.

(51) Int. Cl.
| | | |
|---|---|---|
| *H04W 72/04* | (2009.01) | |
| *H04L 1/18* | (2006.01) | |
| *H04L 1/08* | (2006.01) | |
| *H04W 74/08* | (2009.01) | |
| *H04L 1/00* | (2006.01) | |

(52) U.S. Cl.
CPC ........... *H04W 72/0413* (2013.01); *H04L 1/08* (2013.01); *H04L 1/1812* (2013.01); *H04L 1/1893* (2013.01); *H04W 74/08* (2013.01); *H04L 1/0003* (2013.01); *H04L 1/0009* (2013.01); *H04L 1/1819* (2013.01)

(58) Field of Classification Search
None
See application file for complete search history.

(56) References Cited

U.S. PATENT DOCUMENTS

| | | | |
|---|---|---|---|
| 2010/0182952 A1* | 7/2010 | Jeong | H04L 1/189 370/328 |
| 2017/0288817 A1* | 10/2017 | Cao | H04L 1/1812 |
| 2018/0042043 A1 | 2/2018 | Babaei et al. | |
| 2018/0049229 A1 | 2/2018 | Dinan et al. | |
| 2018/0070335 A1* | 3/2018 | Amuru | H04L 5/0091 |

(Continued)

OTHER PUBLICATIONS

International Search Report and Written Opinion—PCT/US2019/019099—ISA/EPO—dated Jun. 19, 2019.

(Continued)

*Primary Examiner* — Brian S Roberts
(74) *Attorney, Agent, or Firm* — Michael J. DeHaemer, Jr.

(57) ABSTRACT

Techniques and apparatus for enhancing uplink grant-free transmissions and/or downlink semi-persistent scheduling (SPS) transmissions for uplink ultra-reliable low latency communications (URLLC) are described. One technique includes receiving a first configuration for a first grant-free communication and a second configuration for at least one second grant-free communication. Grant-free communications are performed based on at least one of the first configuration or the second configuration.

74 Claims, 11 Drawing Sheets

(56) References Cited

U.S. PATENT DOCUMENTS

| | | | |
|---|---|---|---|
| 2018/0139774 A1* | 5/2018 | Ma | H04W 72/14 |
| 2018/0176945 A1* | 6/2018 | Cao | H04L 1/1864 |
| 2018/0288746 A1* | 10/2018 | Zhang | H04L 1/0031 |
| 2018/0295651 A1* | 10/2018 | Cao | H04W 72/042 |
| 2019/0053319 A1* | 2/2019 | Jeon | H04L 27/2613 |
| 2020/0037314 A1* | 1/2020 | Xiong | H04W 72/0446 |

OTHER PUBLICATIONS

Huawei et al., "Reliability Enhancement for Grant-Free Transmission", 3GPP Draft, R1-1801787, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397761, 6 Pages, Retrieved from the Internet: URL:http://www.3gpp.org/ftp/tsg%5Fran/WG1%5FRL1/TSGR1%5F92/Docs/ [retrieved on Feb. 17, 2018], Section 4, p. 3, Lines 8-18.

Huawei et al., "UL Data Transmission With and Without SR/UL Grant", 3GPP Draft, R1-1715419, 3rd Generation Partnership Project (3GPP), Mobile Competence Centre, 650, Route Des Lucioles, F-06921 Sophia-Antipolis Cedex, France, No. Nagoya, Japan, Sep. 18, 2017-Sep. 21, 2017, Sep. 17, 2017 (Sep. 17, 2017), XP051338887, 11 Pages, Retrieved from the Internet: URL:http://www.3gpp.org/ftp/Meetings_3GPP_SYNC/RAN1/Docs/ [retrieved on Sep. 17, 2017]. p. 1, Line 1-p. 2, Line 21.

Partial International Search Report—PCT/US2019/019099—ISA/EPO—dated Apr. 29, 2019.

ZTE: "Consideration on SPS", 3GPP Draft, R2-1704698 Consideration on SPS, 3rd Generation Partnership Project (3GPP), Mobile Competence Centre, 650, Route Des Lucioles , F-06921 Sophiaantipolis Cedex , France, vol. RAN WG2, No. Hangzhou, China, May 15, 2017-May 19, 2017, May 5, 2017 (May 5, 2017), XP051263869, 5 Pages, Retrieved from the Internet: URL:http://www.3gpp.org/ftp/tsg_ranWG2_RL2/TSGR2_98/Docs/ [retrieved on May 5, 2017], p. 3, Line 16—p. 4, Line 11.

* cited by examiner

ENHANCED UPLINK GRANT-FREE/DOWNLINK SEMI-PERSISTENT SCHEDULING FOR ULTRA-RELIABLE LOW LATENCY COMMUNICATIONS

CROSS-REFERENCE TO RELATED APPLICATION

This application claims the benefit of and priority to U.S. Provisional Patent Application No. 62/634,106, filed Feb. 22, 2018, which is assigned to the assignee hereof and hereby expressly incorporated by reference herein.

BACKGROUND

I. Field of the Disclosure

The present disclosure relates generally to wireless communication systems, and more particularly, to techniques and apparatus for enhancing uplink grant-free transmissions and/or downlink semi-persistent scheduling (SPS) transmissions, e.g., for ultra-reliable low latency communications (URLLC).

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a first configuration for a first grant-free communication. The method also includes receiving a second configuration for at least one second grant-free communication. The method further includes performing grant-free communications with a base station (BS) based on at least one of the first configuration or the second configuration.

Certain aspects provide an apparatus for wireless communication. The apparatus includes means for receiving a first configuration for a first grant-free communication. The apparatus also includes means for receiving a second configuration for at least one second grant-free communication. The apparatus further includes means for performing grant-free communications with a base station (BS) based on at least one of the first configuration or the second configuration.

Certain aspects provide an apparatus for wireless communication. The apparatus generally includes a receiver, at least one processor, and a memory coupled to the at least one processor. The receiver is configured to receive a first configuration for a first grant-free communication. The receiver is also configured to receive a second configuration for at least one second grant-free communication. The at least one processor is configured to perform grant-free communications with a base station (BS) based on at least one of the first configuration or the second configuration.

Certain aspects provide a computer-readable medium having computer-executable code stored thereon for wireless communications by a user equipment (UE). The computer executable code includes code for receiving a first configuration for a first grant-free communication. The computer executable code also includes code for receiving a second configuration for at least one second grant-free communication. The computer executable code further includes code for performing grant-free communications with a base station (BS) based on at least one of the first configuration or the second configuration.

Certain aspects provide a method for wireless communication by a base station (BS). The method generally includes determining a first configuration for a first grant-free communication. The method also includes determining a second configuration for at least one second grant-free communication. The method further includes sending the first configuration and the second configuration to at least one user equipment (UE).

Certain aspects provide an apparatus for wireless communication. The apparatus includes means for determining a first configuration for a first grant-free communication. The apparatus also includes means for determining a second configuration for at least one second grant-free communication. The apparatus further includes means for sending the first configuration and the second configuration to at least one user equipment (UE).

Certain aspects provide an apparatus for wireless communication. The apparatus generally includes a transmitter, at least one processor, and a memory coupled to the at least one processor. The at least one processor is configured to determine a first configuration for a first grant-free communication. The at least one processor is also configured to determine a second configuration for at least one second grant-free communication. The transmitter is configured to send the first configuration and the second configuration to at least one user equipment (UE).

Certain aspects provide a computer-readable medium having computer-executable code stored thereon for wireless communications by a base station (BS). The computer executable code includes code for determining a first configuration for a first grant-free communication. The computer executable code also includes code for determining a second configuration for at least one second grant-free communication. The computer executable code further includes code for sending the first configuration and the second configuration to at least one user equipment (UE).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
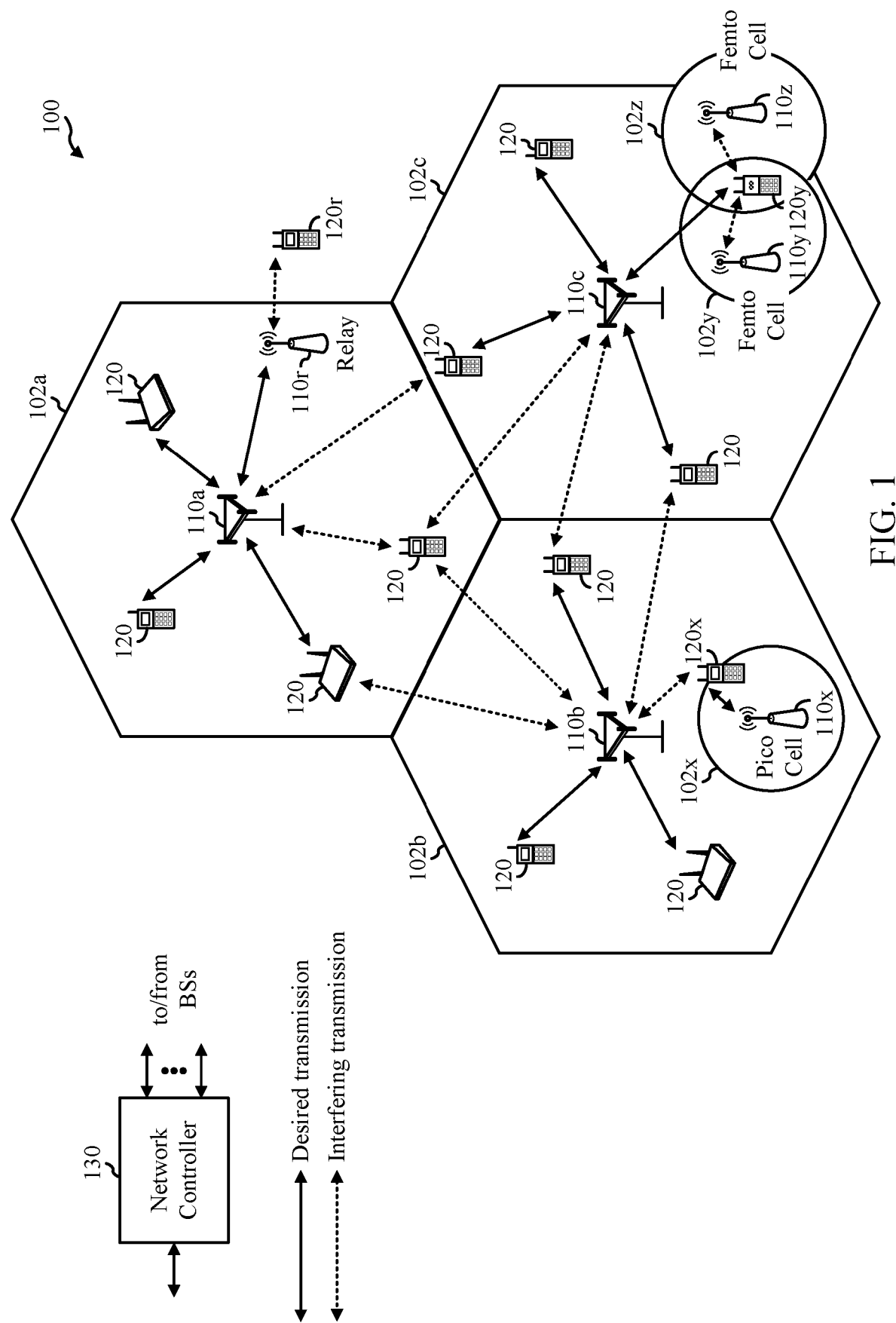
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR access (e.g., 5G technology) may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

One focus of the development of 5G NR systems has been on supporting URLLC. URLLC applications may have mission critical traffic and, in general, may be associated with strict latency-reliability requirements. Using factory automation deployments as a reference example, there may be two types of URLLC applications: (1) Type 1 URLLC applications and (2) Type 2 URLLC applications. Type 1 URLLC applications may have a latency requirement of less than 10 milliseconds (ms) and a target reliability of $1\text{-}10^{-9}$. Type 2 URLLC applications may have a latency requirement between 10 ms to 50 ms and a target reliability between $1\text{-}10^{-6}$ to $1\text{-}10^{-9}$.

In some cases, 5G systems may support semi-persistent scheduling (SPS) and/or grant-free transmissions to reduce latency and/or meet target reliability of applications. However, current designs for SPS/grant-free transmissions may not be sufficient for meeting the latency and/or target reliability of URLLC applications. For example, current designs generally support SPS/grant-free transmission on the initial (e.g., first) transmission, but may not support SPS/grant-free transmission on subsequent (e.g., second, third, etc.) re-transmission(s). In these cases, the subsequent re-transmission(s) may be associated with additional control signaling (e.g., physical downlink control channel (PDCCH)). Using additional control signaling, however, can increase overhead (e.g., reducing amount of resources for URLLC data), increase latency (e.g., additional time associated with decoding grant for URLLC data), degrade reliability (e.g., increases likelihood of a decoding failure of the grant), etc., for URLLC applications.

Accordingly, aspects of the present disclosure provide enhanced techniques for SPS and/or grant-free transmissions that can be used to meet latency and/or reliability requirements for particular applications, e.g., URLLC applications.

In some aspects, a UE may receive, from a gNB, multiple configurations for at least one grant-free communication. Each configuration may be associated with a different latency condition (or threshold) for the grant-free communication, a different modulation and coding scheme (MCS) for the grant-free communication, a different service type for the grant-free communication, etc. In some aspects, the UE may receive multiple configurations for a single (e.g., initial) grant-free communication. The UE may select one of the multiple configurations for the single grant-free communication based at least in part on one or more criteria, and perform the grant-free communication based on the selected configuration. The criteria may include, for example, a target MCS, a service type, a target latency, etc. Grant-free communications may include at least one of downlink SPS transmissions (e.g., from the gNB to the UE) or uplink grant-free transmissions (e.g., from the UE to the gNB).

In some aspects, the UE may receive multiple configurations for multiple grant-free communications. For example, a UE may receive a first configuration for a first (e.g., initial) grant-free communication and a second configuration for one or more second (e.g., subsequent) grant-free communications. The UE may perform grant-free communications with the gNB based on at least one of the first configuration or the second configuration. For example, the UE may receive an initial downlink SPS transmission(s) (e.g., based on the first configuration) and one or more subsequent downlink SPS transmissions (e.g., based on the second configuration). In another example, the UE may send an initial uplink grant-free transmission(s) (e.g., based on the first configuration) and one or more subsequent uplink grant-free transmissions (e.g., based on the second configuration). In this manner, 5G systems can reduce control signaling associated with (re)transmissions of SPS/grant-free transmissions, which in turn, can achieve better system utilization, enhanced reliability and lower latency (typically associated with URLLC applications).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies mentioned above as well as other wireless networks and radio technologies, such as a 5G nextgen/NR network.

Example Wireless Communications System

FIG. 1 illustrates an example wireless communication network 100, such as a new radio (NR) or 5G network, in which aspects of the present disclosure may be performed, for example, for configuring (and/or sending) transmissions and/or re-transmission(s) of downlink SPS/uplink grant-free traffic for URLLC. In some cases, the network 100 may be a multi-slice network, where each slice defines as a composition of adequately configured network functions, network applications, and underlying cloud infrastructures that are bundled together to meet the requirement of a specific use case or business model.

As illustrated in FIG. 1, the wireless communication network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may communicate directly with one another in addition to communicating with the scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
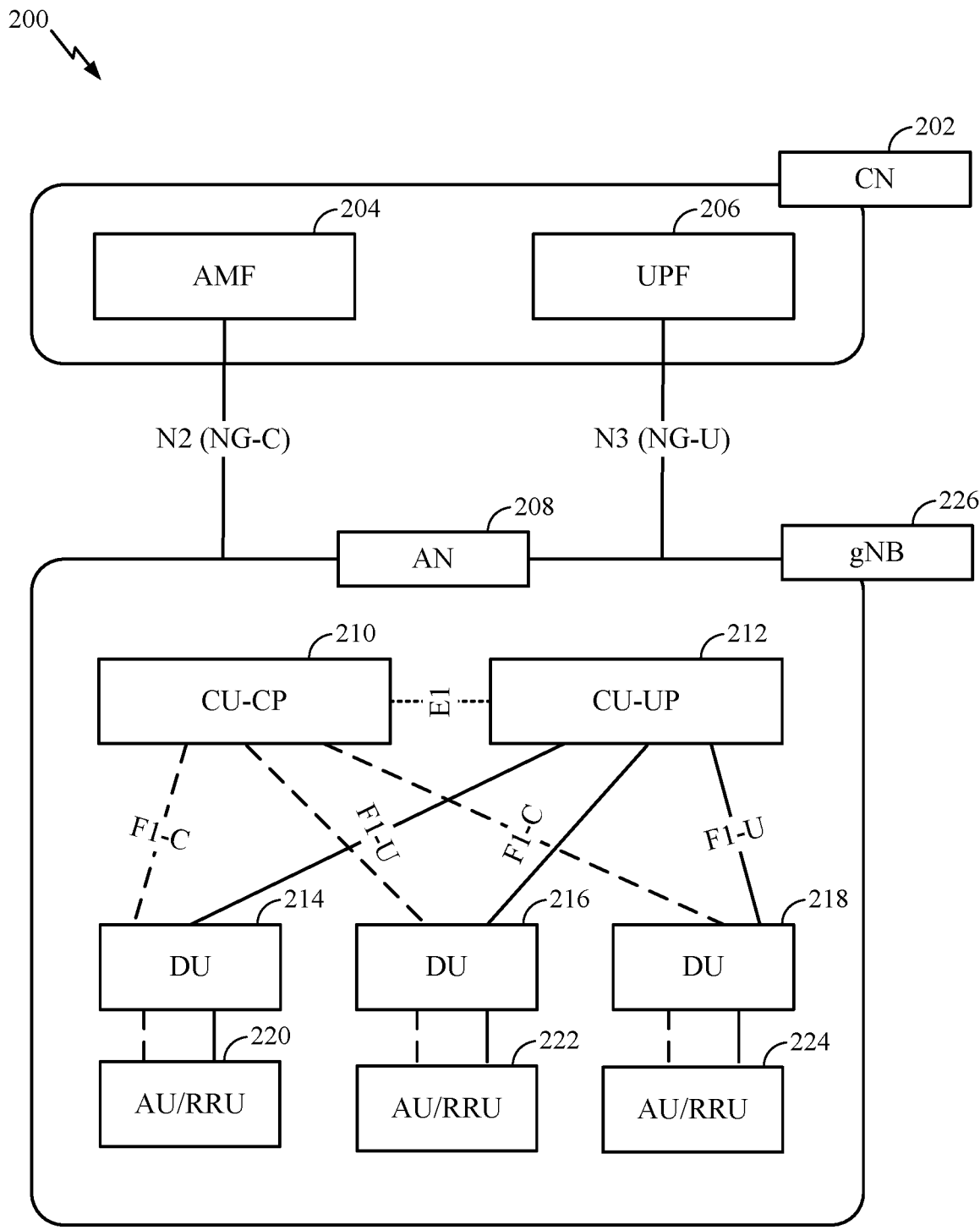
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224. The DU may be connected to an AU/RRU via each of the F1-C and F1-U interfaces.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the N AN and/or UE.

Figure 3:
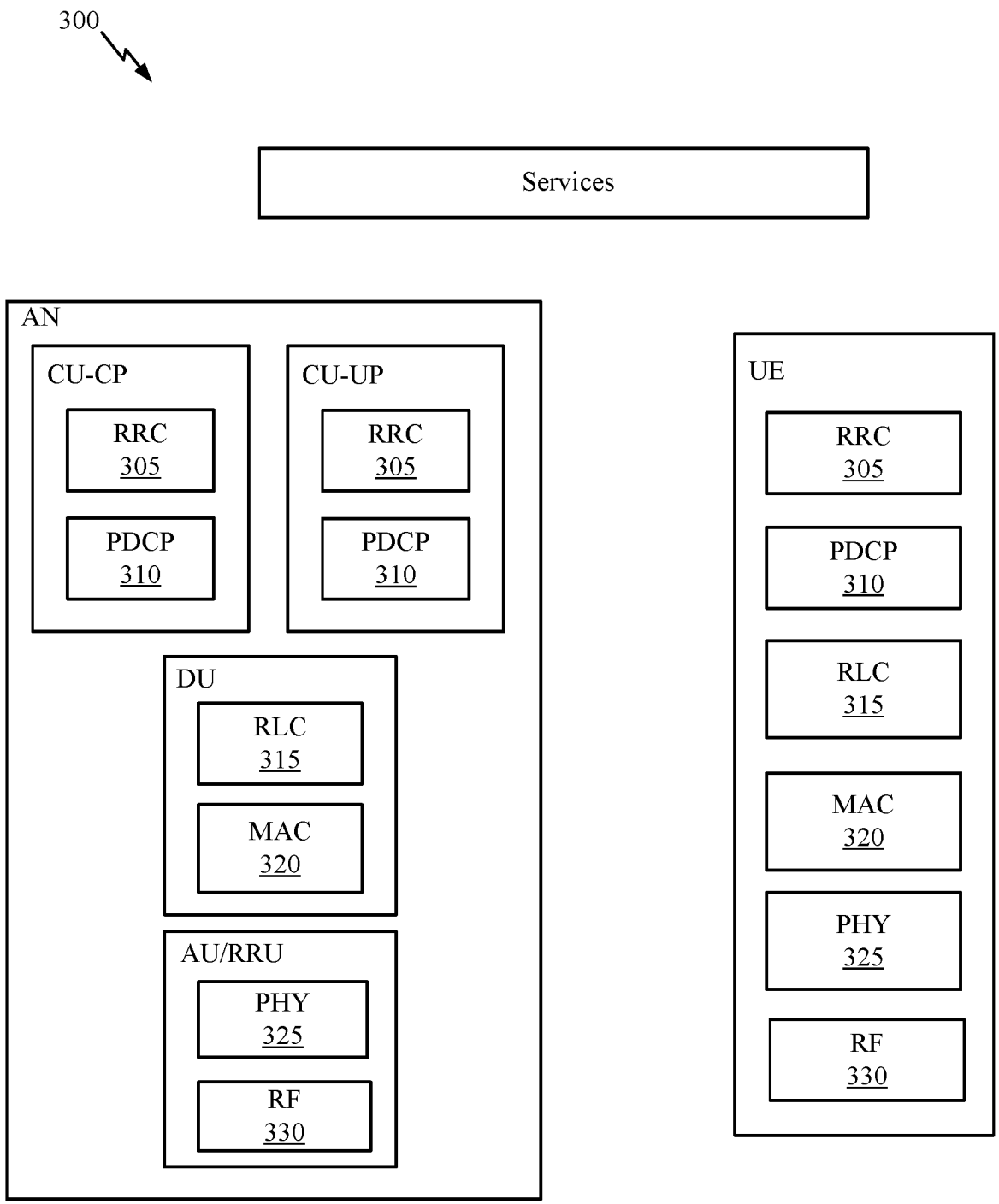
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
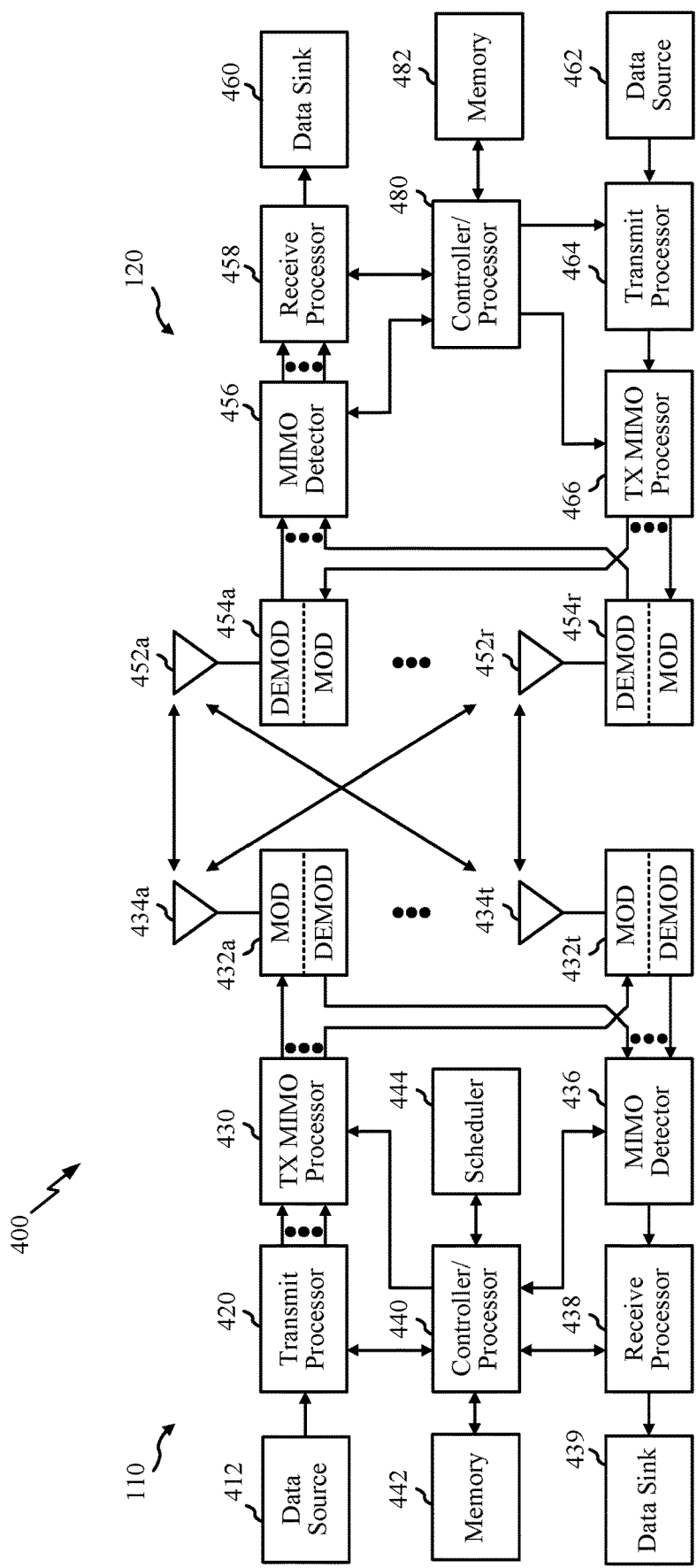
FIG. 4 is a block diagram conceptually illustrating a design of an example base station (BS) and user equipment (UE), in accordance with certain aspects of the present disclosure.

FIG. 4 illustrates example components of the BS 110 and UE 120 (as depicted in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 7-8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of the functional blocks illustrated in FIG. 8 and/or other processes for the techniques described herein. The processor 480 and/or other processors and modules at the UE 120 may also perform or direct, e.g., the execution of the functional blocks illustrated in FIG. 7 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
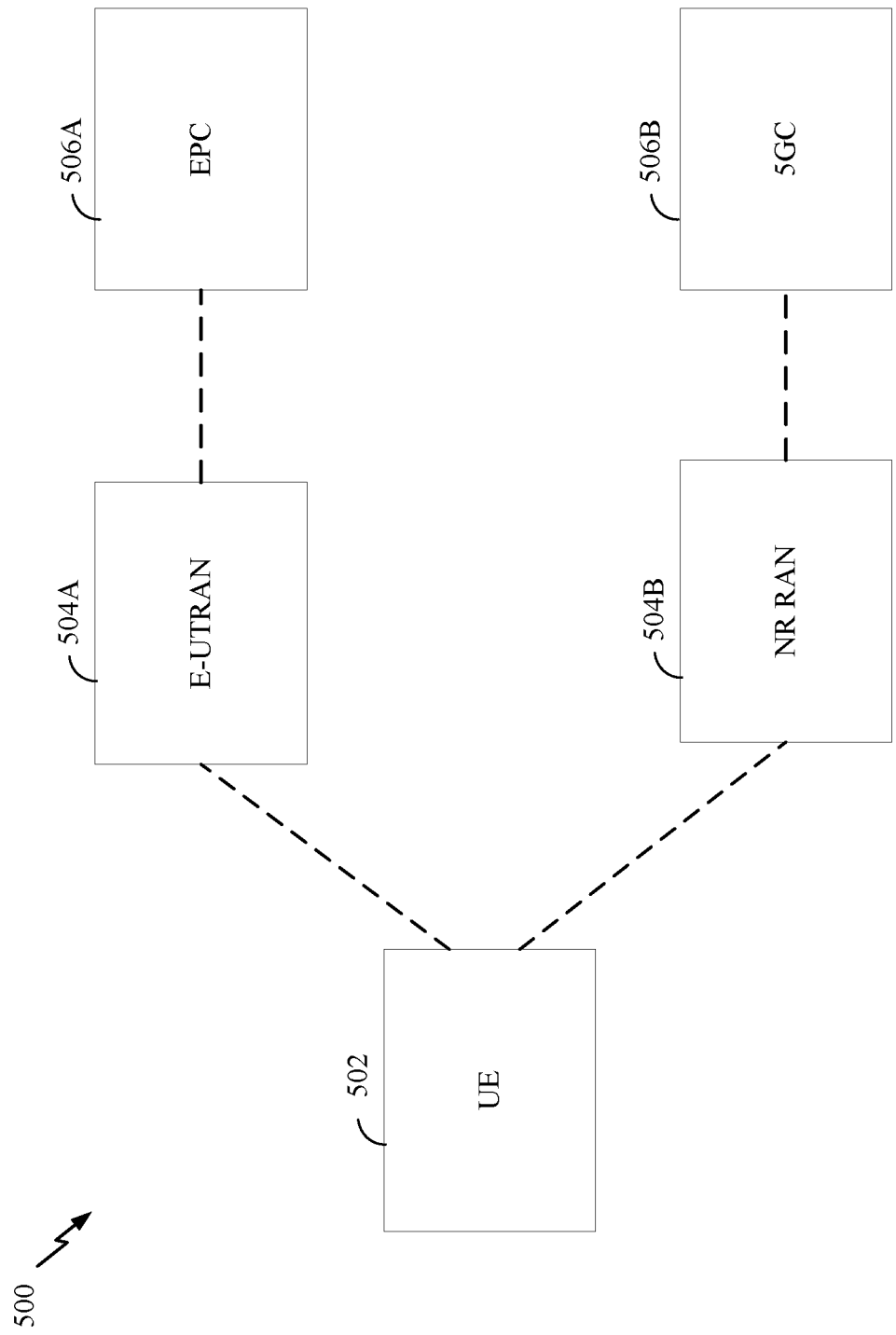
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
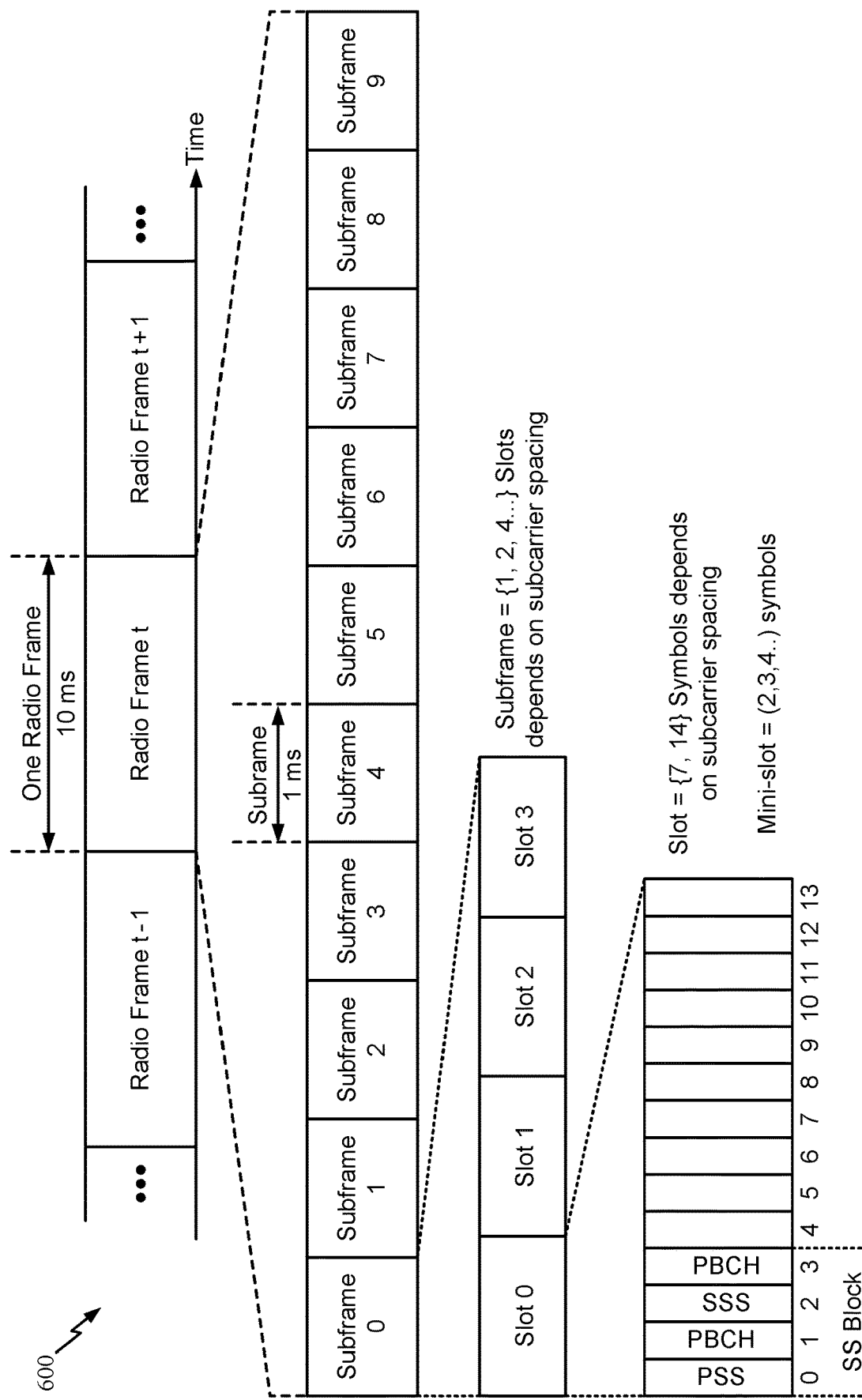
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

As noted, URLLC applications may have latency-reliability standards that are stricter compared to other types of traffic. As an example, in some URLLC (e.g., Type 1) applications, latency may not exceed 10 ms and the target reliability may be $1-10^{-9}$. In other URLLC (e.g., Type 2) applications, latency may be in the range of 10 ms to 50 ms and the target reliability may be in between $1-10^{-6}$ to $1-10^{-9}$. To meet such standards, the individual channels including UL/DL control channels may also have similar target reliability.

In some cases, reducing latency and/or increasing reliability can be achieved by minimizing dynamic control signaling (e.g., using semi-static allocation patterns). For example, certain systems (e.g., LTE, NR, etc.) may support grant-free transmissions and/or SPS scheduling. In LTE, SPS was introduced to support applications with (semi) periodic traffic by eliminating (or reducing) PDCCH overhead where data inter-arrival times are constant. When a UE is configured with SPS, certain parameters, such as the number of HARQ processes, periodicity, etc., can be indicated via RRC. The UE can then be explicitly activated to use such parameters (e.g., via PDCCH) for multiple additional SPS transmissions (e.g., without monitoring/decoding additional PDCCH). The PDCCH that activates the SPS transmissions may have a cyclic redundancy check (CRC) scrambled by a SPS radio network temporary identifier (RNTI) configured for the UE.

NR may also support semi-static allocation patterns. For example, NR may support uplink grant-free transmissions and/or downlink SPS transmissions. As used herein, grant-free transmission generally refers to data transmission with grant-free resource(s) (e.g., no resources dedicated/allocated in an uplink grant). There may be two types of UL data transmission without a grant: Type 1 and Type 2. For Type 1, the UL data transmission without grant may be only based on RRC (re)configuration without any L1 signaling. That is, parameters for the UL data transmission such as MCS/TBS table, time/frequency resources, etc. may be UE specific and RRC configured. For Type 2, the UL data transmission without grant may be based on both RRC configuration and L1 signaling for activation/deactivation for UL data transmission without grant. UL grant-free Type 2, thus, may be similar to SPS where dynamic signaling (DCI) is used for activation/deactivation of RRC configured resources.

Additionally, in some cases, grant-free/SPS designs may use transport block (TB) repetitions (with the same or different redundancy version (RV) index) to increase reliability. That is, the initial grant-free/SPS transmission can have a number of repetitions (e.g., up to 8 retransmissions), and each repetition can have its own RV index. Using UL grant-free transmission as a reference example, each HARQ identifier (ID) can have up to K repetitions, where K∈{1, 2, 4, 8}. The HARQ ID associated with the K repetitions of a TB may be determined from the following equation (1):

$$\text{HARQ Process ID} = \text{floor}(X/\text{UL-TWG-periodicity}) \mod \text{UL-TWG-numbHARQproc} \quad (1)$$

where X refers to the symbol index of the first transmission occasion of the repetition bundle that takes place. For example, X=(SFN*SlotPerFrame*SymbolPerSlot+ Slot_index_in_SF*SymbolPerSlot+Symbol_Index_In-Slot). UL-TWG-periodicity represents the periodicity of UL grant-free, and UL-TWG-numbHARQproc represents the number of HARQs supported in UL grant-free. The n-th transmission occasion of K repetitions may be associated with the (mod(n−1,4)+1)-th value in the configured RV sequence {RV1, RV2, RV3, RV4}, where n=1,2, . . . , K.

RV sequences may be configured by UE-specific RRC signaling to be one of the following: Sequence 1: {0, 2, 3, 1}, Sequence 2: {0, 3, 0, 3}, Sequence 3: {0, 0, 0, 0}. For any RV sequence, repetition may end at the last transmission occasion within the period P. P is not more than GF/SPS periodicity. The transmission occasion (TO) may refer to the time domain resource allocation of one repetition in an aggregation with factor K, where the aggregated transmission occasions start in resources configured by the offset and the period. In NR, retransmissions (except for repetition(s)) of GP/SPS may use dynamic grant.

Example Enhanced Uplink Grant-Free/Downlink SPS Design for URLLC

In some situations, the current design for grant-free/SPS communications may not be sufficient for meeting the latency/reliability standards associated with URLLC applications. In the current design, for example, the UE may be configured with a single (active) configuration for a grant-free communication. In many cases, however, this single configuration (including the configured parameters, such as number of repetitions, frequency resources, transmit power, etc.) may not be suitable for meeting one or more predetermined conditions (e.g., based on a MCS, service type, and/or latency).

Additionally, while grant-free transmissions may be associated with a predefined number of (K) repetitions, such a design may have some drawbacks. There may be cases (e.g., when channel conditions are above a threshold) in which a given UE may not have to always go through all K number of repetitions. If the TB is successfully decoded at one or more first repetitions, the rest of the repetitions aggregated with K may cause unnecessary interference to other UEs that share the same resource(s), which in turn can reduce system utilization and degrade reliability.

In some cases, a transmitter with GF/SPS resource(s) may stop TB repetition in case of early ACK reception, but such ACK signaling may also have some drawbacks. For example, ACK signaling to end the repetitions may increase control overhead, which in turn can degrade system efficiency (e.g., in cases with (semi) periodic traffic with small data packets). ACK signaling may also impact the control channel design, which may have its own reliability issues/considerations. Additionally, in some cases, ACK signaling may not always be possible (e.g., in unlicensed band(s), the UE may not be clear to transmit) and/or the UE may have to wait a significant amount of time before sending such signaling (e.g., in unlicensed band(s), ACK signaling may need clear channel assessment (CCA) to obtain the channel, increasing latency). In addition, the ACK signaling, itself, may bring additional latency in TDD for a given slot format related information (SFI).

Further, in some cases, using PDCCH for retransmission (as in current grant-free/SPS designs) can significantly increase the amount of time-frequency resources used for grant-free/SPS. Accordingly, it may be desirable to remove the overhead associated with PDCCH and additional control signaling for URLLC.

According to certain aspects, techniques presented herein enable devices (e.g., in 5G systems) to send grant-free/SPS not only for the initial transmission, but also for the re-transmission(s) (e.g., assuming re-transmission(s) are needed). Doing so may reduce control overhead (e.g., permitting retransmission for more devices), reduce latency, improve reliability, etc.

Figure 7:
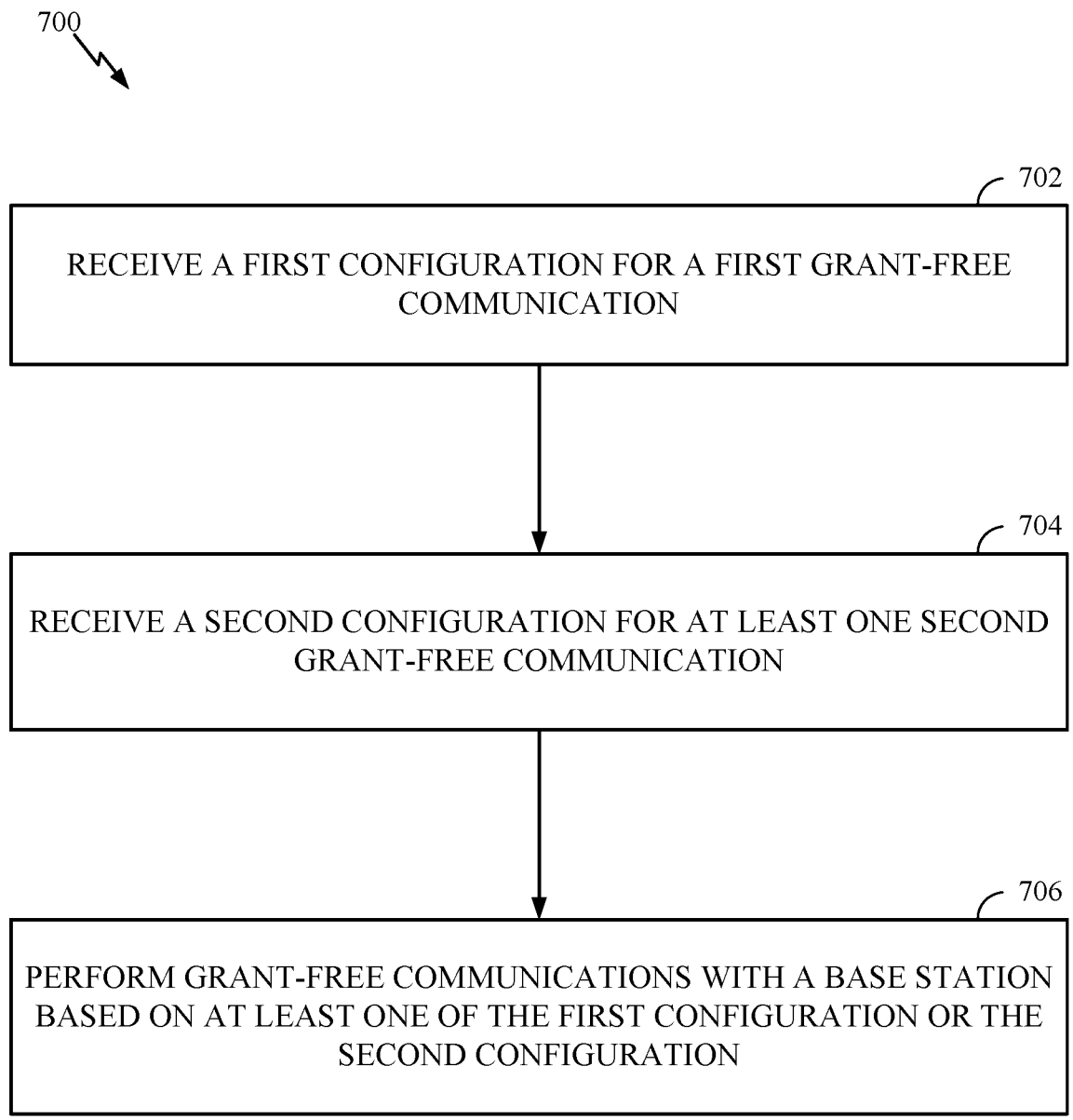
FIG. 7 illustrates example operations for wireless communications performed by a user equipment, in accordance with certain aspects of the present disclosure.

FIG. 7 illustrates example operations 700 for wireless communications, in accordance with aspects of the present disclosure. Operations 700 may be performed, for example, by a user equipment (e.g., URLLC UE), such as UE 120 shown in FIG. 1. Operations 700 may be implemented as software components that are executed and run on one or more processors (e.g., processor 480 of FIG. 4). Further, the transmission and reception of signals by the UE in operations 700 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

Operations 700 begin, at 702, where the UE receives a first configuration for a first grant-free communication. At 704, the UE receives a second configuration for at least one second grant-free communication. At 706, the UE performs grant-free communications based on at least one of the first configuration or the second configuration.

Figure 8:
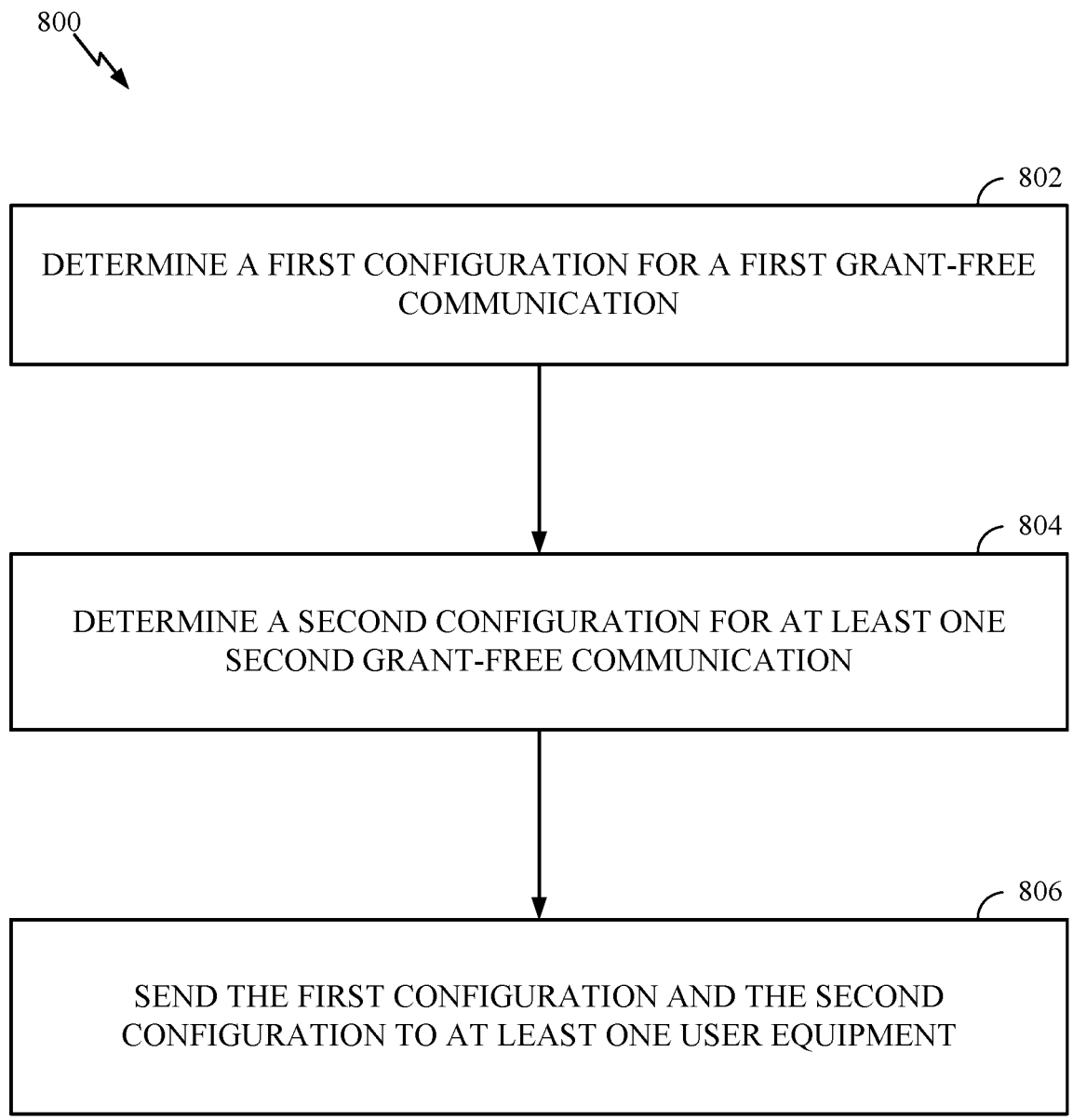
FIG. 8 illustrates example operations for wireless communications performed by a base station, in accordance with certain aspects of the present disclosure.

FIG. 8 illustrates example operations 800 for wireless communications, in accordance with aspects of the present disclosure. Operations 800 may be performed, for example, by a base station that supports URLLC (e.g., a gNB), such as BS 110 shown in FIG. 1. Operations 800 may be implemented as software components that are executed and run on one or more processors (e.g., processor 440 of FIG. 4). Further, the transmission and reception of signals by the BS in operations 800 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

Operations 800 begin, at 802, where the base station determines a first configuration for a first grant-free communication. At 804, the base station determines a second configuration for at least one second grant-free communication. At 806, the base station sends the first configuration and the second configuration to at least one UE.

As used herein, grant-free communication may refer to at least one of uplink grant-free transmission or downlink SPS transmission. For example, the UE may receive initial downlink SPS transmissions (e.g., based on the first configuration) and one or more subsequent downlink SPS transmissions (e.g., based on the second configuration) from the gNB. In another example, the UE may send initial uplink grant-free transmissions (e.g., based on the first configuration) and one or more subsequent uplink grant-free transmissions (e.g., based on the second configuration) to the gNB.

In some aspects, a URLLC UE can be configured with grant-free/SPS resources for the initial transmission and also one or more retransmissions. In some cases, the UE can be configured with different grant-free/SPS configurations. For example, the first configuration (e.g., in operations 702, 802) may be for an initial TB transmission and the second configuration (e.g., in operations 704, 804) may be for the initial TB transmission. In this case, the UE may receive multiple active configured grant-free configurations for a given bandwidth part (BWP) of a serving cell. Each grant-free configuration may support a different service type, traffic type, MCS target, etc. The UE can select the particular grant-free configuration to use, based in part, on the expected traffic or service type, MCS target, latency target, etc. for the grant-free communications.

In another example, the first configuration (e.g., in operations 702, 802) may be for the initial TB transmission and the second configuration (e.g., in operations 704, 804) may be for TB retransmission(s). In some cases, the grant-free/SPS for the initial transmission may be configured with a less number of resources than the grant-free/SPS for the retransmission(s). Since the probability of using the retransmission resources may be low, more UEs can be multiplexed on the same resources, leading to better system utilization, enhanced reliability, and lower latency.

Each grant-free/SPS configuration can be UE-specific RRC configured. In one aspect, the gNB may jointly activate the (first and second) grant-free/SPS configurations (e.g., for the initial transmission and retransmission(s)) with a single message. In some aspects, the gNB may independently activate each of the first and second grant-free/SPS configurations. For example, the grant-free/SPS configuration for the first transmission or retransmission(s) may not be activated, in which case the UE may monitor PDCCH for the un-activated grant-free/SPS configuration. In some aspects, the first and/or second configurations may be activated upon receiving the first and second configurations. For example, the RRC configuration of the first and/or second configurations may activate the first and/or second configurations. That is, the RRC configuration by default may be associated with activation.

The gNB may activate the configurations via downlink control information (DCI) or MAC control element (MAC-CE) signaling. The initial transmission and/or retransmission(s) may be associated with multiple SPS configurations and DCI may activate one of the configurations. In some cases, the configuration for retransmission(s) may use a different (or larger) bandwidth part (BWP) compared to the configuration for the initial transmission.

For the grant-free/SPS configuration associated with the initial transmission (e.g., first configuration) and the grant-free/SPS configuration associated with retransmission(s) (e.g., second configuration), RNTIs (for the configurations) may be configured by UE-specific RRC signaling. For example, in some aspects, the same RNTI may be dedicated for the first configuration and the second configuration. In this aspect, one or more bits in the DCI may indicate whether the activation is for the first or the retransmission(s). In some aspects, RNTIs may be different between the first and second configurations (e.g., for the respective initial transmission and the retransmission(s)).

Each grant-free/SPS configuration can include several parameters for the (initial or retransmissions) grant-free/SPS transmissions. The parameters can include at least one of a number of time repetitions and/or (allocated) frequency resources, transmit power, waveform type, rank and precoding matrix, demodulation reference signal (DMRS) configuration, RV sequence, transport block size (TBS), etc. In some cases, the number of repetitions can be semi-statically updated (e.g., by RRC reconfiguration or MAC-CE signaling or activation DCI) as the link quality (e.g., as reported by the via CQI or RRM measurements) changes.

Some of the parameters (and/or a value of some parameters) in the first configuration may be the same or different than parameters (and/or value of parameters) in the second configuration. For example, in some cases, the TBS may be the same between the initial transmission and the retransmission(s). In some examples, the waveform type may be CP-OFDM for the initial transmission, and DFT-S-OFDM for the retransmission(s) (e.g., the UE may switch to DFT-S-OFDM to increase coverage enhancement). In general, however, any of the parameters above may be different or same between the initial transmission and retransmission(s). The parameter(s) may be configured/updated via MAC-CE or L1 signaling. In some aspects, a number of parameters in the second configuration may be smaller than a number of parameters in the first configuration. For example, the network/gNB may choose not to signal again the parameter(s) that are common between the initial transmission and retransmission(s).

In some aspects, performing the grant-free communications (e.g., at 706) may include using a first RV index of the RV sequence in the first set of parameters for the first grant-free communication and using a second RV index of the RV sequence in the second set of parameters for the at least one second grant-free communication. In some aspects, performing the grant-free communications (e.g., at 706) may include using a first RV index of the RV sequence in the first set of parameters for the first grant-free communication and using the first RV index of the RV sequence in the second set of parameters for the at least one second grant-free communication.

Figure 9:
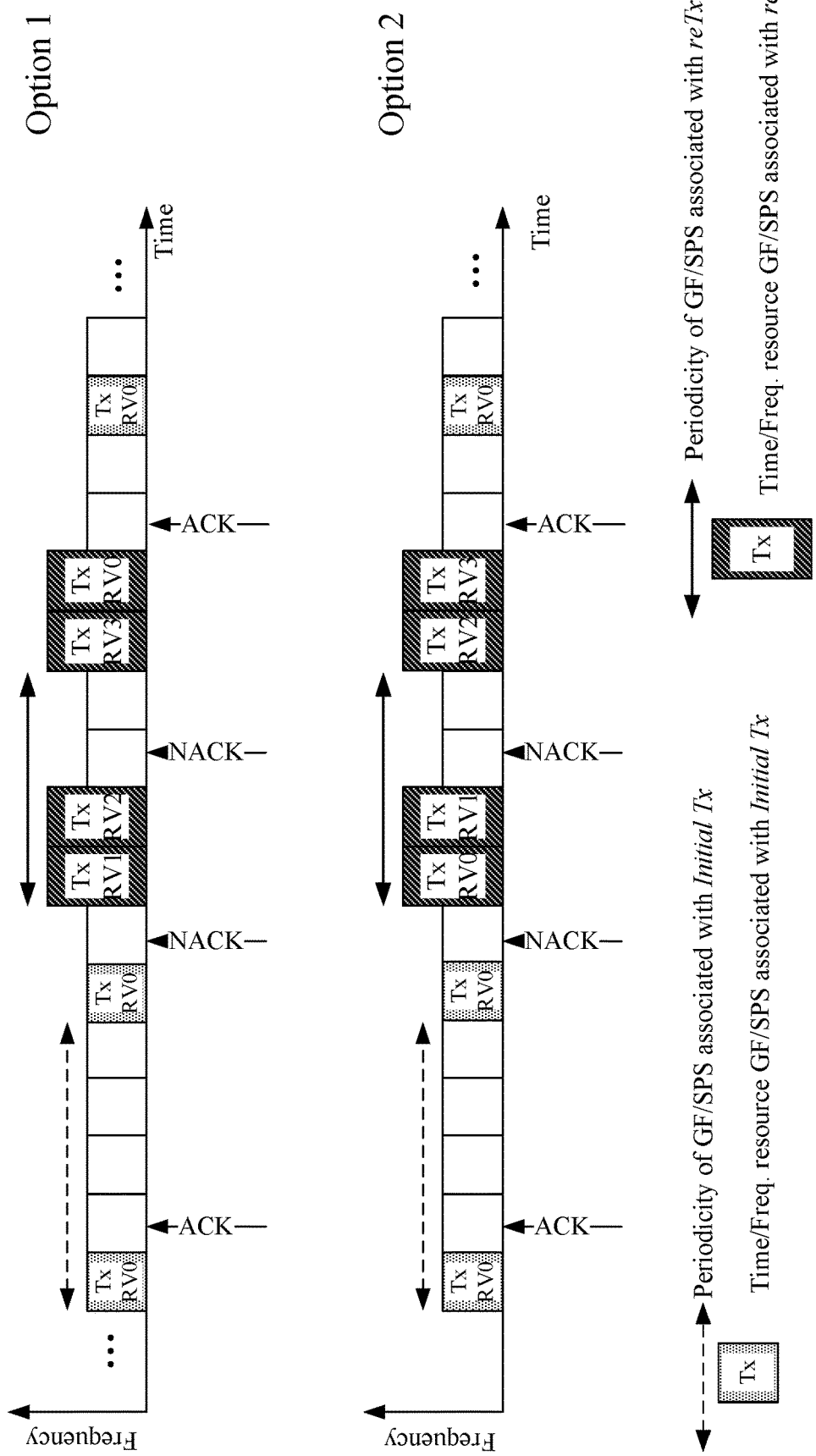
FIG. 9 illustrates different examples of determining redundancy version (RV) for different transmissions of a transport block, in accordance with certain aspects of the present disclosure.

There may be different options for RV determination for different transmissions of the same TB(s). For example, assume the same RV sequence is configured for the first and second configurations (that is, the RV sequence in the first set of parameters is the same as the RV sequence in the second set of parameters). In such cases, there may be aspects in which the gNB/UE continues the RV index (e.g., in the retransmissions) from the initial transmission. Alternatively, in such cases, there may aspects in which the gNB/UE resets the RV index (e.g., in the retransmission(s)) from the initial transmission. FIG. 9 illustrates a reference example of how the RV index can be continued (e.g., Option 1) and how the RV index can be reset (e.g., Option 2) for different transmissions of the same TB(s), according to certain aspects of the present disclosure.

As shown for both Option 1 and Option 2 in FIG. 9, the grant-free/SPS corresponding to the initial transmission supports K=1 (e.g., no repetition), while the grant-free/SPS corresponding to the retransmission supports K=2 (e.g., one repetition). In option 1, the n-th transmission occasion may be associated with the (mod(n−1,4)+1)-th value in the configured RV sequence {RV0, RV1, RV2, RV3}, where n=1, 2, ..., K', and K' represents the total number of repetitions associated with both initial transmission and retransmission. As shown in Option 1 in FIG. 9, after a NACK is received in the initial transmission (with RV0), the RV sequence continues for the retransmission (e.g., the first repetition of the first retransmission is associated with RV1, and the second repetition of the first retransmission is associated with RV2). As shown in Option 2 in FIG. 9, after a NACK is received in the initial transmission (with RV0), the RV sequence resets for the retransmission (e.g., the first repetition of the first retransmission is associated with RV0, and the second repetition of the first retransmission is associated with RV1).

In some aspects, different RV sequences may be configured for the initial transmission and retransmission(s) (that is, the RV sequence in the first set of parameters is different from the RV sequence in the second set of parameters). In such cases, the Option 1 or Option 2 (in FIG. 9) may also be used for RV determination. For example, in Option 1, a first RV index of the RV sequence in the first configuration may be used for the initial transmission, and a second RV index of the RV sequence in the second configuration may be used for the retransmission(s). In Option 2, a first RV index of the RV sequence in the first configuration may be used for the initial transmission, and a first RV index of the RV sequence in the second configuration may be used for the retransmission(s). The grant-free/SPS associated with the retransmissions can indicate the same set of RV sequences as in NR (e.g., {0, 0, 0, 0}, {0, 2, 3, 1}, {0, 3, 0, 3}), or new sequences.

Note for the sake of clarity, FIG. 9 assumes there is a single HARQ ID. However, those of ordinary skill in the art will recognize that the techniques described herein for RV determination may be used for multiple HARQ IDs. Further, as also shown, a larger amount of resources may be allocated for the retransmissions than the initial transmission.

Figure 10:
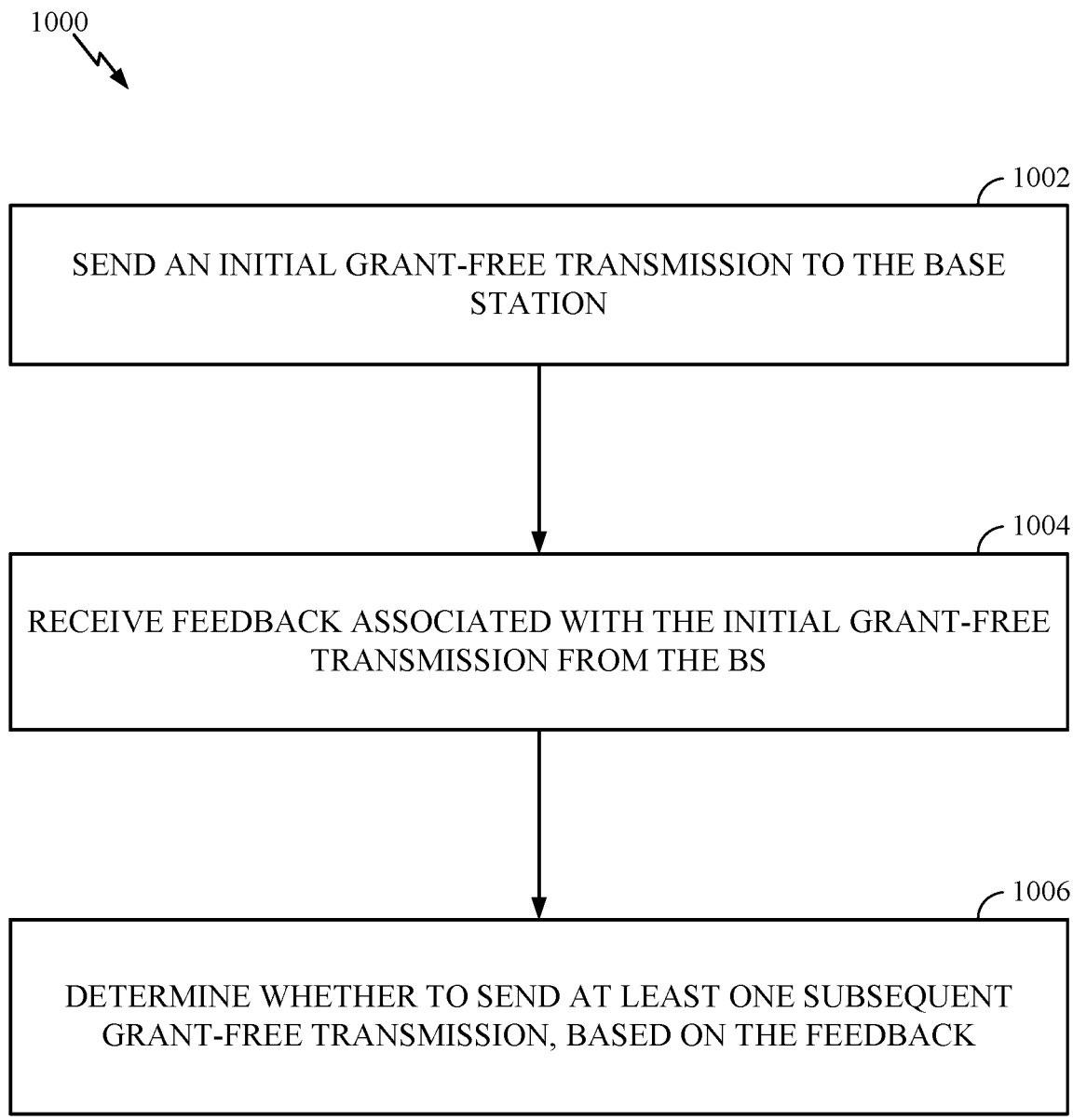
FIG. 10 illustrates example operations for wireless communications performed by a user equipment, in accordance with certain aspects of the present disclosure.

FIG. 10 illustrates example operations 1000 for wireless communications, in accordance with aspects of the present disclosure. Operations 1000 may be performed, for example, by a user equipment (e.g., URLLC UE), such as UE 120 shown in FIG. 1. Operations 1000 may be implemented as software components that are executed and run on one or more processors (e.g., processor 480 of FIG. 4). Further, the transmission and reception of signals by the UE in operations 1000 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals. In some aspects, operations 1000 may be performed as part of operations 700 (e.g., at 706) in FIG. 7.

Operations 1000 begin, at 1002, where the UE sends an initial grant-free transmission to the BS. At 1004, the UE receives feedback associated with the initial grant-free transmission from the BS. The feedback may be received via one or more resources dedicated to the UE or via a group DCI associated with a plurality of UEs including the UE. At 1006, the UE determines whether to send at least one subsequent grant-free transmission based on the feedback.

Figure 11:
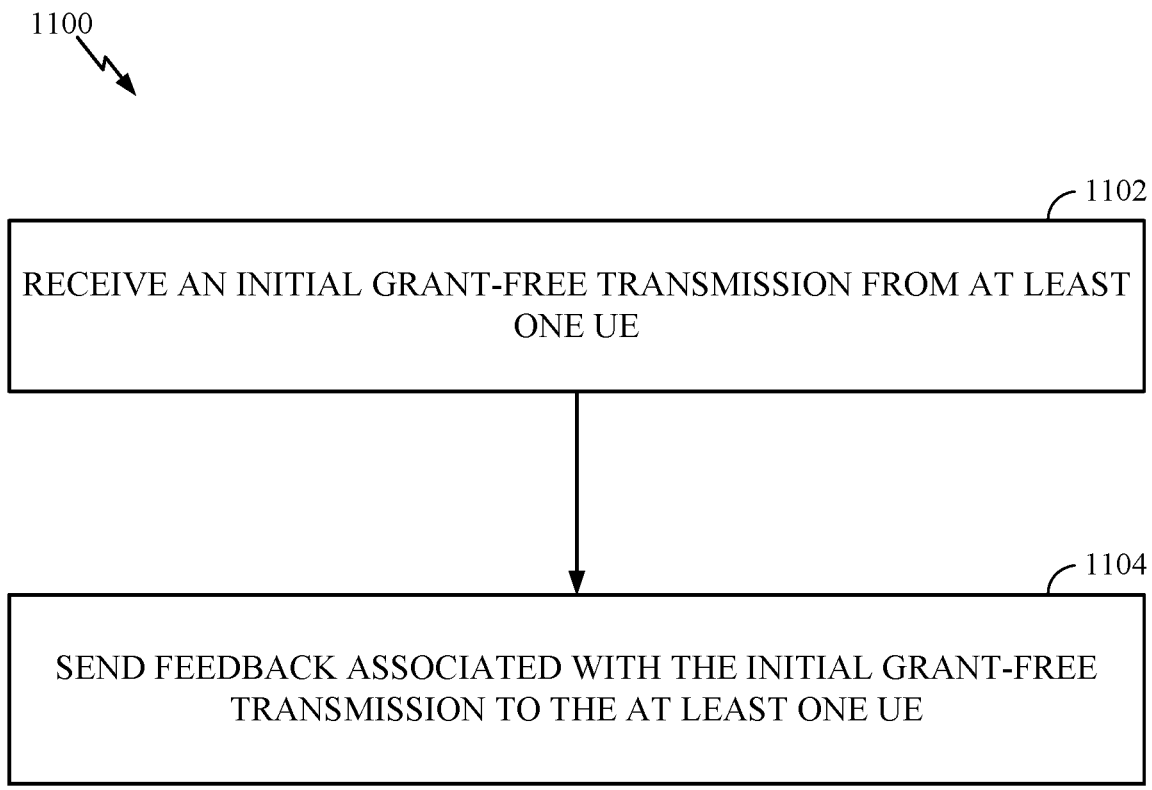
FIG. 11 illustrates example operations for wireless communications performed by a base station, in accordance with certain aspects of the present disclosure.

FIG. 11 illustrates example operations 1100 for wireless communications, in accordance with aspects of the present disclosure. Operations 1100 may be performed, for example, by a base station that supports URLLC (e.g., a gNB), such as BS 110 shown in FIG. 1. Operations 1100 may be implemented as software components that are executed and run on one or more processors (e.g., processor 440 of FIG. 4). Further, the transmission and reception of signals by the BS in operations 1100 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

Operations 1100 begin, at 1102, where the base station receives an initial grant-free transmission from at least one UE. At 1104, the base station sends feedback associated with the initial grant-free transmission to the at least one UE.

According to certain aspects, the gNB may trigger (e.g., at 1004/1104) the use of retransmission resources with NACK signaling in the downlink. For example, the UE may (determine to) send the at least one subsequent grant-free transmission if the feedback comprises a NACK. This may enable a reduction in downlink signaling from the multiple bits associated with an uplink grant to one (or a few) bit(s) of NACK. The NACK can be UE-specific or in a group-common DCI shared by multiple UEs. Using NACK in this manner may result in a triggered UL transmission, but instead of triggering with an uplink grant, the retransmission(s) can be triggered by one (or few) bit(s) indicator using pre-configured resource(s). In some aspects, this may also achieve DCI size compression, in the sense that the DCI is pre-transmitted or pre-configured, but triggered by the NACK. In this case, the $2^{nd}$ grant-free resource may be a resource activated by L1 signaling (e.g., NACK from gNB).

In some cases, the retransmission resources used for the uplink grant-free transmissions may overlap between multiple UEs. For example, assume two UEs both need retransmission. In this case, if a single resource is shared by the two UEs, using a single NACK state to trigger retransmission from both UEs may not be sufficient, as the two NACKs (with the same state) may imply that the shared retransmission resource is for both UEs.

To reduce the likelihood of overlapping retransmission resources, the gNB in some aspects may use multiple bits for ACK/NACK (e.g., in HARQ feedback) to indicate one of multiple different resources for the retransmission. For example, the NACK may include multiple bits, and a value of the multiple bits may indicate resources for the UE to use for the at least one subsequent grant-free transmission. The UE may then send the subsequent grant-free transmission on the resources indicated by the value of the multiple bits. In one example, assuming there are two UEs, the gNB may use two bits for the ACK/NACK to indicate one out of three different resources. That is, each of three states (e.g., "00", "01" and "10") may map to NACK and indicate a different resource, whereas the fourth state (e.g., "11") may map to ACK, in which case, retransmission may not be needed. Note that while this example uses two bits as a reference example of a multiple state ACK/NACK, those of ordinary skill in the art will recognize that any number of bits may be used for the feedback (e.g., based on the number of UEs subject to using overlapping retransmission resources).

In some aspects, to reduce the likelihood of overlapping retransmission resources, the gNB may schedule one of the UEs with an uplink grant for the retransmission, and the other UE may use the grant-free resources triggered by the NACK bit in the group common DCI. For example, the UE, as part of operations 1000, may monitor for a grant for the at least one subsequent grant-free transmission if the feedback includes a NACK, and send the subsequent grant-free transmission (which may be a retransmission of the initial grant-free transmission) in accordance with the received grant.

In some aspects, performing the grant-free communications (e.g., at 706) may include receiving an initial downlink SPS transmission from the BS and sending feedback associated with the initial downlink SPS transmission to the BS. In some aspects, preforming the grant-free communications (e.g., at 706) may include monitoring for the subsequent downlink SPS transmission from the BS if the feedback includes a NACK. For downlink SPS transmissions, the $2^{nd}$ SPS resource(s) can be implicitly monitored when UE sends a NACK. In this aspect, the PDCCH grant for the retransmission can be completely saved (e.g., unused). The UE can transmit NACK if packet fails, and may monitor/receive retransmission on $2^{nd}$ SPS resources. The gNB, upon receiving the NACK, can use the $2^{nd}$ SPS for retransmission.

In some cases, for downlink SPS, when retransmission resources are shared across UEs, a single NACK state may not be enough to prevent an overlap of retransmission resources. For example, if two UEs both need retransmission, a single NACK (from each UE) may result in the two UEs expecting retransmission on the same shared $2^{nd}$ SPS resource. In some aspects, the reduce the likelihood of an overlap, each UE can use multiple bits (e.g., two bits or more) for ACK/NACK to indicate one out of multiple different SPS configurations/resources (e.g., one out of 3 different configurations, assuming 2 bits are used) to be monitored for that occasion. For example, the NACK can include multiple bits, a value of the multiple bits can indicate resources for the UE to use for monitoring for the subsequent downlink SPS transmission, and the resources indicated by the multiple bits can be monitored by the UE for the subsequent downlink SPS transmission. This multiple bit feedback scheme for downlink SPS may be similar to the multiple bit feedback scheme described above for uplink grant-free. Note, however, that in some cases, there may still be a collision (when receiving the 2nd downlink SPS transmission) among the set of resources selected by the different UEs, but the likelihood of collision may be less than the likelihood of collision associated with a semi-static partitioning and assignment of retransmission resources by the gNB.

In some aspects, to reduce the likelihood of overlap for downlink SPS transmissions, one of the UEs can be scheduled with a dynamic grant for receiving a subsequent downlink transmission (e.g., a retransmission of the initial downlink SPS transmission), and another of the UEs can receive PDSCH on the $2^{nd}$ SPS resource(s). In some cases, the gNB may configure the UE (e.g., in the first and/or second configurations) to monitor PDCCH anyway in addition to the SPS resources.

In some aspects, to reduce the likelihood of overlap for downlink SPS transmissions, the gNB via common DCI can signal the retransmission resources for multiple UEs. This aspect may be similar to GC-DCI for uplink grant-free resource monitoring.

In some aspects, to reduce the likelihood of overlap for downlink SPS transmissions, the UE(s) may blindly decode the multiple PDSCH resources for the $2^{nd}$ SPS retransmission(s). This aspect may be efficient from a collision handling perspective, but may impact the UE processing timeline.

HARQ feedback may be transmitted for uplink-grant-free transmissions and downlink SPS transmissions. For example, the gNB may send HARQ feedback associated with uplink-grant-free transmissions, and the UE may send HARQ feedback associated with downlink SPS transmissions. In NR, the gNB may send HARQ feedback for UL data on PDCCH (e.g., there may not be a PHICH in NR). The UE may send HARQ feedback on PUCCH.

In some aspects, to reduce HARQ overhead for uplink grant-free transmissions, the gNB may send ACK/NACK feedback in group common DCI (GC-DCI) shared by multiple UEs. The HARQ feedback in the GC-DCI may be received by the UE (e.g., at 1004).

In some aspects, to reduce HARQ overhead for uplink grant-free transmissions, the gNB may perform ACK/NACK multiplexing for different HARQ-IDs. For example, HARQ feedback at DL symbol n may contain ACK/NACK for up to m possible previous HARQ-IDs (e.g., m=1, 2, or 4). In some cases, the HARQ feedback may include a bitmap for each UE, and the bitmap may include multiplexed (or bundled) ACK/NACKs. The value m may be fixed or may be UE-specific RRC signaled.

Similarly, in some aspects, to reduce HARQ overhead for downlink SPS transmissions, the UE may perform ACK/NACK multiplexing for different HARQ-IDs. In this aspect, the UE may use a larger PUCCH resource in frequency and/or time (compared to the PUCCH resource used for non-multiplexed ACK/NACK). The PUCCH resource(s) can be RRC configured and/or signaled within DCI activation.

In some cases, there may be one or more timing issues associated with HARQ feedback in GC-DCI. For example, HARQ feedback for uplink grant-free transmissions (in NR) is generally a synchronous transmission, meaning the HARQ ID is implicitly derived based on specific transmission time. However, a problem may arise when different UEs each with multiple HARQ processes have multiplexed ACK/NACKs in GC-DCI (e.g., it may be hard to have synchronous transmission for all UEs in GC-DCI). Thus, it may be desirable to provide UEs with techniques for determining which ACK/NACK field in GC-DCI corresponds to its HARQ-ID(s).

According to certain aspects, the UE may determine/identify the ACK/NACK field in the GC-DCI that corresponds to its HARQ-ID(s) based on a single HARQ ID.

According to certain aspects, the HARQ feedback may be associated with multiple HARQ IDs. For example, the ACK/NACK bit(s) (in the HARQ feedback) corresponding to each UE may represent multiplexed ACK/NACK for a window of l last HARQ IDs. In such cases, the UE may determine the number of its HARQ IDs multiplexed in GC-DCI based on the number of HARQ occasions within the window (no matter whether the UE has sent data in that occasion or not), the time instance of the GC-DCI transmission, and the time gap between its last possible HARQ ID and GC-DCI transmission. In some aspects, the UE may not expect to receive ACK/NACK for its last HARQ ID(s) if the time gap is less than u symbols, where u is UE-specific RRC configured or a fixed value. The value l can be semi-statically fixed for all UEs or UE specific RRC signaled. In some aspects, a fixed l may be used (e.g., which may make decoding easier). In some aspects, l may be associated/determined based on a semi-static HARQ window.

In some aspects, performing the grant-free communications (e.g., at 706) may include determining at least one of the initial grant-free transmission or the at least one subsequent grant-free transmission is successful if feedback is not received within a time window after sending at least one of the initial grant-free transmission or the at least one subsequent grant-free transmission. In particular, to reduce HARQ overhead for uplink grant-free transmissions/downlink SPS transmissions, the gNB/UE may send selective NACK feedback. That is, the receiver (e.g., gNB, UE, etc.) may only transmit NACK when it fails to decode the packet, otherwise the receiver may refrain from sending feedback (from which the transmitter implies ACK). In some cases, the gNB may configure a timeline (or timeline window) for the DL/UL feedback. Within the window, the receiver (e.g., gNB, UE, etc.) may transmit NACK if the packet fails. The transmitter (e.g., UE, gNB, etc.) may assume ACK if it does not receive NACK within the window. In some cases, since BLER corresponding to the initial transmission may be small (e.g., $10^{-2}$), the selective NACK can reduce the overall feedback overhead (e.g., especially for the initial transmission). The PUCCH resource(s) for selective NACK associated with downlink SPS can be RRC configured and/or signaled within DCI activation.

In some cases, there may be additional issues for selective NACK in an unlicensed environment. For example, in an unlicensed environment, there could be a listen before talk (LBT) failure. In this case, in some aspects, the receiver could perform selective NACK together with the TXOP (e.g., timeline window) indication. This may be beneficial for DL ACK/NACK feedback for UL packet(s). For example, if the configured feedback timeline window is within the DL slots of a TXOP and the gNB does not transmit NACK, the UE may assume the packet is successful. On the other hand, such a scheme may not work well in UL ACK/NACK feedback if the UE has to do additional CCA within the gNB indicated TXOP, in which case it may not be possible to skip an ACK from the UE. For example, if the gNB does not receive an NACK from the UE within the window, it may be because the UE was not clear to transmit (in the unlicensed band), and not that the UE successfully decoded the downlink packet.

NR may support advanced CSI (A-CSI) feedback. In such cases, for uplink grant-free/downlink SPS, an A-CSI report may be triggered by NACK. This triggering may happen, e.g., when the packet is not successfully delivered/decoded after an initial transmission. In some aspects, A-CSI reporting can be triggered when ACK is quickly received to increase MCS or to decrease the number of repetitions in order to enhance system utilization. The gNB may trigger an A-CSI report for the last m out of K (m≤K) receptions in current grant-free/SPS configuration. The triggering can be UE specific or for a group of UEs. MCS can be adjusted when configuring the next (re)-transmission.

For downlink SPS transmissions, the PUCCH resource(s) for A-CSI feedback may be semi-statically configured with SPS configuration. For example, a NACK reception (e.g., by the gNB) may trigger an A-CSI report (e.g., from the UE). The NACK and A-CSI can be multiplexed on the same resource or mapped to different resources.

For uplink grant-free transmissions, one the gNB transmits NACK, e.g., in GC-DCI, this may implicitly or explicitly trigger an A-CSI from the UE. Once A-CSI is triggered, it can be piggybacked on PUSCH or it can be transmitted on a separate resource (e.g., configured within SPS configuration or indicated within DCI). In cases where A-CSI is multiplexed with PUSCH, a small beta may be desirable to maintain a high reliability for PUSCH.

In some cases, there may timeline issues associated with reporting HARQ feedback. For example, the PDSCH to HARQ-ACK timeline (e.g., $k_1$) is typically RRC configured or signaled with DCI activation. Upon detection of a DL SPS PDSCH in slot n, the UE may transmit HARQ-ACK in slot $n+k_1$. However, there may be situations in which there is at least one semi-statically configured DL symbol that overlaps with the symbol(s) carrying HARQ-ACK in slot $n+k_1$. Accordingly, it may be desirable to provide techniques for transmitting HARQ feedback in such cases.

In some aspects, the UE can rate-match around the overlap. For example, since the gNB has knowledge of the SFI, the UE can rate match around the semi-statically configured DL symbol(s). In some aspects, the UE can drop the ACK/NACK transmission, e.g., if the non-overlapping resources are insufficient (e.g., below a threshold) for reliable PUCCH transmission. In this aspect, the gNB may assume a NACK. In some cases, the UE may still transmit on remaining non-overlapping resources if the UE is sending an ACK. However, if it is a NACK, the UE may not transmit in order to prevent NACK to ACK error at the gNB. In some aspects, the UE may transmit HARQ-ACK feedback in slot $n+k'_1$, where slot $n+k'_1$ is the first slot after $n+k_1$ in which none of the symbols carrying HARQ-ACK overlap with semi-statically configured DL symbols. In this case, the UE may perform HARQ-ACK multiplexing/bundling, e.g., in slot $n+k'_1$.

In some cases, there may be situations when there is at least one semi-statically configured UL symbol that overlaps with DL SPS symbol(s) carrying PDSCH in slot n. In such situations, the gNB, in some aspects, can puncture or rate match around the UL symbols. In some aspects, the gNB can drop the PDSCH transmission, e.g., if non-overlapping resources are insufficient (e.g., below a threshold) for reliable PDSCH transmission.

In some cases, there may be situations when there is at least one semi-statically configured DL symbol that overlaps with UL grant-free symbol(s) carrying PUSCH in slot n. In such situations, since the gNB is aware of the SFI, the UE, in some aspects, can rate match around the DL symbol(s). In some aspects, the UE may drop the PUSCH transmission, e.g., if non-overlapping resources are insufficient (e.g., below a threshold) for reliable PUSCH transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for communicating, means for performing, means for signaling, means for configuring, means for monitoring, means for indicating, means for detecting, means for triggering and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for scheduling, means for activating, means for multiplexing, means for detecting, means for decoding, means for triggering, means for dropping, means for reducing, means for allocating, means for monitoring, means for performing, means from refraining, means for identifying, means for puncturing, means for rate-matching, means for configuring, means for supporting, means for using, means for determining and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a first configuration for a first grant-free communication, including an initial grant-free communication;
   receiving a second configuration for at least one second grant-free communication including at least one retransmission of the first grant-free communication; and
   performing grant-free communications with a base station (BS) based on at least one of the first configuration or the second configuration.

2. The method of claim 1, wherein performing grant-free communications comprises at least one of sending a grant-free transmission or receiving a grant-free transmission.

3. The method of claim 2, wherein receiving the grant-free transmission comprises receiving a downlink semi-persistent scheduling (SPS) transmission.

4. The method of claim 1, wherein:
   the first grant-free communication comprises an initial grant-free transmission; and
   the at least one second grant-free communication comprises at least one subsequent grant-free transmission.

5. The method of claim 4, wherein performing the grant-free communications comprises:
   sending the initial grant-free transmission to the BS;
   receiving feedback associated with the initial grant-free transmission from the BS; and
   determining whether to send the at least one subsequent grant-free transmission based on the feedback.

6. The method of claim 5, wherein the feedback is received via one or more resources dedicated to the UE or via a group downlink control information (DCI) associated with a plurality of UEs including the UE.

7. The method of claim 5, wherein performing the grant-free communications comprises sending the at least one subsequent grant-free transmission if the feedback comprises a negative acknowledgement (NACK).

8. The method of claim 7, wherein:
   the NACK comprises a plurality of bits;
   a value of the plurality of bits indicates resources for the UE to use for the at least one subsequent grant-free transmission; and
   the at least one subsequent grant-free transmission is sent on the resources indicated by the value of the plurality of bits.

9. The method of claim 5, further comprising:
   monitoring for a grant for the at least one subsequent grant-free transmission if the feedback comprises a negative acknowledgment (NACK); and
   after receiving the grant, sending the at least one subsequent grant-free transmission in accordance with the received grant, wherein the at least one subsequent grant-free transmission is a retransmission of the initial grant-free transmission.

10. The method of claim 4, wherein performing the grant-free communications comprises at least one of sending the initial grant-free transmission or sending the at least one subsequent grant-free transmission, the method further comprising receiving hybrid automatic repeat request (HARQ) feedback for at least one of the initial grant-free transmission or the at least one subsequent grant-free transmission.

11. The method of claim 10, wherein the HARQ feedback is received via a group downlink control information (DCI).

12. The method of claim 11, wherein the HARQ feedback is associated with a single HARQ identifier (ID).

13. The method of claim 11, wherein the HARQ feedback is associated with a plurality of HARQ identifiers (IDs).

14. The method of claim 13, further comprising:
determining which of the plurality of HARQ IDs is associated with the UE based on a number of HARQ occasions within a HARQ window, a transmission time of the group DCI, and a time gap between a time when a last HARQ ID of the plurality of HARQ IDs associated with the UE is received and the transmission time of the group DCI; and
determining whether at least one of the initial grant-free transmission or the at least one subsequent grant-free transmission is successful based on the HARQ feedback associated with the determined HARQ IDs.

15. The method of claim 13, further comprising:
determining which of the plurality of HARQ IDs is associated with the UE based on a single HARQ ID associated with the UE; and
determining whether at least one of the initial grant-free transmission or the at least one subsequent grant-free transmission is successful based on the HARQ feedback associated with the single HARQ ID.

16. The method of claim 10, wherein the HARQ feedback comprises only negative acknowledgments (NACKs).

17. The method of claim 10, further comprising sending channel state information (CSI) in response to determining the HARQ feedback comprises a negative acknowledgement (NACK).

18. The method of claim 17, wherein the CSI is sent on resources allocated for a physical uplink shared channel (PUSCH).

19. The method of claim 17, wherein the CSI is sent on resources indicated via the first configuration or the second configuration.

20. The method of claim 10, further comprising sending channel state information (CSI) in response to determining the HARQ feedback comprises an acknowledgement (ACK).

21. The method of claim 4, wherein performing the grant-free communications comprises at least one of sending the initial grant-free transmission or sending the at least one subsequent grant-free transmission, the method further comprising determining at least one of the initial grant-free transmission or the at least one subsequent grant-free transmission is successful if feedback is not received within a time window after sending at least one of the initial grant-free transmission or the at least one subsequent grant-free transmission.

22. The method of claim 4, further comprising identifying an overlap between at least one symbol allocated for downlink transmission and at least one symbol allocated for sending at least one of the initial grant-free transmission or the at least one subsequent grant-free transmission.

23. The method of claim 22, wherein performing the grant-free communications comprises rate-matching around the overlap.

24. The method of claim 22, wherein performing the grant-free communications comprises dropping at least one of the initial grant-free transmission or the at least one subsequent grant-free transmission if an amount of non-overlapping resources allocated for sending at least one of the initial grant-free transmission or the at least one subsequent grant-free transmission is below a threshold.

25. A method for wireless communications by a user equipment (UE), comprising:
receiving a first configuration for a first grant-free communication, the first configuration including a first semi-persistent scheduling (SPS) configuration;
receiving a second configuration for at least one second grant-free communication, the second configuration including a second SPS configuration; and
performing grant-free communications with a base station (BS) based on at least one of the first configuration or the second configuration,
wherein the first grant-free communication comprises an initial downlink SPS transmission according to the first SPS configuration; and
the at least one second grant-free communication comprises at least one subsequent downlink SPS transmission according to the second SPS configuration.

26. The method of claim 25, wherein performing the grant-free communications comprises:
receiving the initial downlink SPS transmission from the BS; and
sending feedback associated with the initial downlink SPS transmission to the BS.

27. The method of claim 26, wherein performing the grant-free communications further comprises monitoring for the at least one subsequent downlink transmission from the BS if the feedback comprises a negative acknowledgement (NACK).

28. The method of claim 27, wherein:
the NACK comprises a plurality of bits;
a value of the plurality of bits indicates resources to use for the at least one subsequent downlink transmission; and
the resources indicated by the value of the plurality of bits are monitored for the at least one subsequent downlink transmission.

29. The method of claim 27, wherein:
the second configuration indicates resources to monitor for the at least one subsequent downlink transmission; and
the indicated resources are monitored for the at least one subsequent downlink transmission.

30. The method of claim 27, further comprising receiving an indication of resources to monitor for the at least one subsequent downlink SPS transmission in downlink control information, wherein the indicated resources are monitored for the at least one subsequent downlink SPS transmission.

31. The method of claim 27, wherein monitoring for the at least one subsequent downlink SPS transmission comprises blindly decoding a plurality of physical downlink shared channel (PDSCH) resources for the at least one subsequent downlink SPS transmission.

32. The method of claim 26, further comprising:
monitoring for a grant for the at least one subsequent downlink SPS transmission if the feedback comprises a negative acknowledgment (NACK); and
after receiving the grant, receiving the at least one subsequent downlink transmission in accordance with the received grant, wherein the at least one subsequent downlink transmission is a retransmission of the initial downlink SPS transmission.

33. The method of claim 26, wherein the feedback comprises hybrid automatic repeat request (HARQ) feedback associated with a plurality of HARQ identifiers (IDs).

34. The method of claim 26, wherein sending the feedback comprises:
refraining from sending an acknowledgement (ACK) if the initial downlink transmission is successfully decoded; and
sending a negative ACK (NACK) if the initial downlink transmission is not successfully decoded.

35. The method of claim 34, further comprising receiving an indication of a time window for sending the feedback after receiving the initial downlink transmission, wherein the NACK is sent if the initial downlink SPS transmission is not successfully decoded within the time window.

36. The method of claim 26, further comprising sending channel state information (CSI) feedback if the feedback comprises a negative acknowledgment (NACK).

37. The method of claim 36, wherein the CSI feedback is sent on a same resource as the NACK.

38. The method of claim 36, wherein the CSI feedback is sent on a different resource than the NACK.

39. The method of claim 26, further comprising:
identifying a time window for sending the feedback; and
detecting, within the time window, an overlap between at least one symbol allocated for downlink transmission and at least one symbol allocated for sending the feedback.

40. The method of claim 39, wherein sending the feedback further comprises rate-matching around the at least one symbol allocated for downlink transmission.

41. The method of claim 39, wherein sending the feedback comprises dropping the feedback if an amount of non-overlapping resources allocated for sending the feedback is below a threshold.

42. The method of claim 39, wherein sending the feedback comprises sending the feedback on non-overlapping resources if the feedback comprises an acknowledgement (ACK).

43. The method of claim 39, wherein sending the feedback comprises, after detecting the overlap within the time window, sending the feedback in a subsequent time window in which there is no overlap between at least one symbol allocated for downlink transmission and at least one symbol allocated for sending the feedback.

44. An apparatus for wireless communications, comprising:
a receiver configured to:
receive a first configuration for a first grant-free communication, including an initial grant-free communication; and
receive a second configuration for at least one second grant-free communication including at least one retransmission of the first grant-free communication;
at least one processor configured to perform grant-free communications with a base station (BS) based on at least one of the first configuration or the second configuration; and
a memory coupled to the at least one processor.

45. A non-transitory computer readable medium having computer executable code stored thereon for:
receiving a first configuration for a first grant-free communication, including an initial grant-free communication;
receiving a second configuration for at least one second grant-free communication including at least one retransmission of the first grant-free communication; and
performing grant-free communications with a base station (BS) based on at least one of the first configuration or the second configuration.

46. A method for wireless communications by a base station (BS), comprising:
determining a first configuration for a first grant-free communication;
determining a second configuration for at least one second grant-free communication, the at least one second grant free communication including at lease one retransmission of the first grant free communication; and
sending the first configuration and the second configuration to at least one user equipment (UE).

47. The method of claim 46, further comprising performing grant-free communications by at least one of sending a grant-free transmission or receiving a grant-free transmission.

48. The method of claim 47, wherein sending a grant-free transmission comprises sending a downlink semi-persistent scheduling (SPS) transmission.

49. The method of claim 46, wherein:
the first configuration includes a first semi-persistent scheduling (SPS) configuration and the first grant-free communication comprises an initial downlink SPS transmission; and
the second configuration includes a second SPS configuration and the at least one second grant-free communication comprises at least one subsequent downlink SPS transmission.

50. The method of claim 49, further comprising:
sending the initial downlink SPS transmission to a plurality of UEs;
receiving feedback from each of the plurality of UEs regarding the initial downlink SPS transmission; and
determining whether to send the at least one subsequent downlink SPS transmission based on the feedback received from each of the plurality of UEs.

51. The method of claim 50, further comprising:
scheduling a first of the plurality of UEs with a grant for receiving the at least one subsequent downlink SPS transmission from the BS, wherein the at least one subsequent downlink SPS transmission is a retransmission of the initial downlink SPS transmission; and
sending to a second of the UEs the at least one subsequent downlink SPS transmission on resources allocated for the at least one subsequent downlink SPS transmission.

52. The method of claim 50, further comprising sending, to each UE, the at least one subsequent downlink SPS transmission if the feedback from the UE comprises a negative acknowledgment (NACK).

53. The method of claim 52, wherein:
the NACK from each UE comprises a plurality of bits;
a value of the plurality of bits indicates resources for sending the at least one subsequent downlink SPS transmission; and
the at least one subsequent downlink SPS transmission is sent to the UE on the resources indicated by the value of the plurality of bits.

54. The method of claim 52, further comprising sending an indication of resources allocated for the at least one subsequent downlink SPS transmission via downlink control information (DCI).

55. The method of claim 49, further comprising:
sending at least one of the initial downlink SPS transmission or the at least one subsequent downlink SPS transmission to a plurality of UEs; and receiving, from each of the UEs, feedback associated with at least one of the initial downlink SPS transmission or the at least one subsequent downlink SPS transmission.

56. The method of claim 55, wherein the feedback comprises hybrid automatic repeat request (HARQ) feedback associated with a plurality of HARQ identifiers (IDs).

57. The method of claim 55, further comprising triggering each UE to send channel state information (CSI) feedback if the feedback comprises an acknowledgment (ACK).

58. The method of claim 55, further comprising sending an indication of a time window in which each UE is to send the feedback to the BS.

59. The method of claim 58, further comprising determining the initial downlink SPS transmission is successful if feedback is not received within the time window.

60. The method of claim 55, further comprising triggering each UE to send channel state information (CSI) feedback if the feedback comprises a negative acknowledgment (NACK).

61. The method of claim 60, wherein:
the initial downlink SPS transmission comprises a number of repetitions; and
each UE is triggered to send CSI feedback for a subset of the number of repetitions.

62. The method of claim 60, wherein the CSI feedback is received on resources allocated for a physical uplink shared channel (PUSCH).

63. The method of claim 60, wherein the CSI feedback is received on resources allocated via the first configuration.

64. The method of claim 60, further comprising identifying an overlap between at least one symbol allocated for uplink transmission and at least one symbol allocated for downlink SPS transmissions.

65. The method of claim 64, further comprising:
sending at least one of the initial downlink SPS transmission or the at least one subsequent downlink SPS transmission; and
puncturing or rate matching around the overlap when sending at least one of the initial downlink SPS transmission or the at least one subsequent downlink SPS transmission.

66. The method of claim 64, further comprising dropping at least one of the initial downlink SPS transmission or the at least one subsequent downlink SPS transmission if an amount of non-overlapping symbols allocated for downlink SPS transmissions is below a threshold.

67. The method of claim 46, wherein:
the first grant-free communication comprises an initial uplink grant-free transmission; and
the at least one second grant-free communication comprises at least one subsequent uplink grant-free transmission.

68. The method of claim 67, further comprising:
receiving the initial uplink grant-free transmission from a plurality of UEs; and
sending feedback associated with the initial uplink grant-free transmission to each UE.

69. The method of claim 68, wherein:
the feedback comprises a NACK; and
the NACK triggers each UE to send the at least one subsequent uplink grant-free transmission to the BS.

70. The method of claim 69, wherein:
the NACK comprises a plurality of bits;
a value of the plurality of bits indicates resources for the UE to use for the at least one subsequent uplink grant-free transmission; and
the at least one subsequent uplink grant-free transmission is received on the resources indicated by the value of the plurality of bits.

71. The method of claim 68, further comprising:
after sending feedback comprising a negative acknowledgement to the plurality of UEs, sending to a first of the UEs a grant for sending the at least one subsequent uplink grant-free transmission, wherein the at least one subsequent uplink grant-free transmission is a retransmission of the initial uplink grant-free transmission; and
receiving from a second of the UEs the at least one subsequent uplink grant-free transmission via resources allocated for the at least one subsequent uplink grant-free transmission.

72. The method of claim 68, wherein:
the feedback comprises hybrid automatic repeat request (HARQ) feedback; and
the HARQ feedback is sent via a group downlink control information (DCI).

73. The method of claim 72, wherein the HARQ feedback comprises multiple HARQ feedback, each associated with a plurality of HARQ identifiers (IDs).

74. The method of claim 68, wherein sending the feedback comprises:
refraining from sending an acknowledgment (ACK) if the initial uplink grant-free transmission is successfully decoded; and
sending a negative ACK (NACK) if the initial uplink grant-free transmission is not successfully decoded.

* * * * *